3,188,287
OIL ABSORPTION PROCESS
Raymond James Hull, Orange, Calif., assignor to Gas Processors, Inc., Brea, Calif., a corporation of California
Filed Sept. 7, 1961, Ser. No. 136,476
10 Claims. (Cl. 208—346)

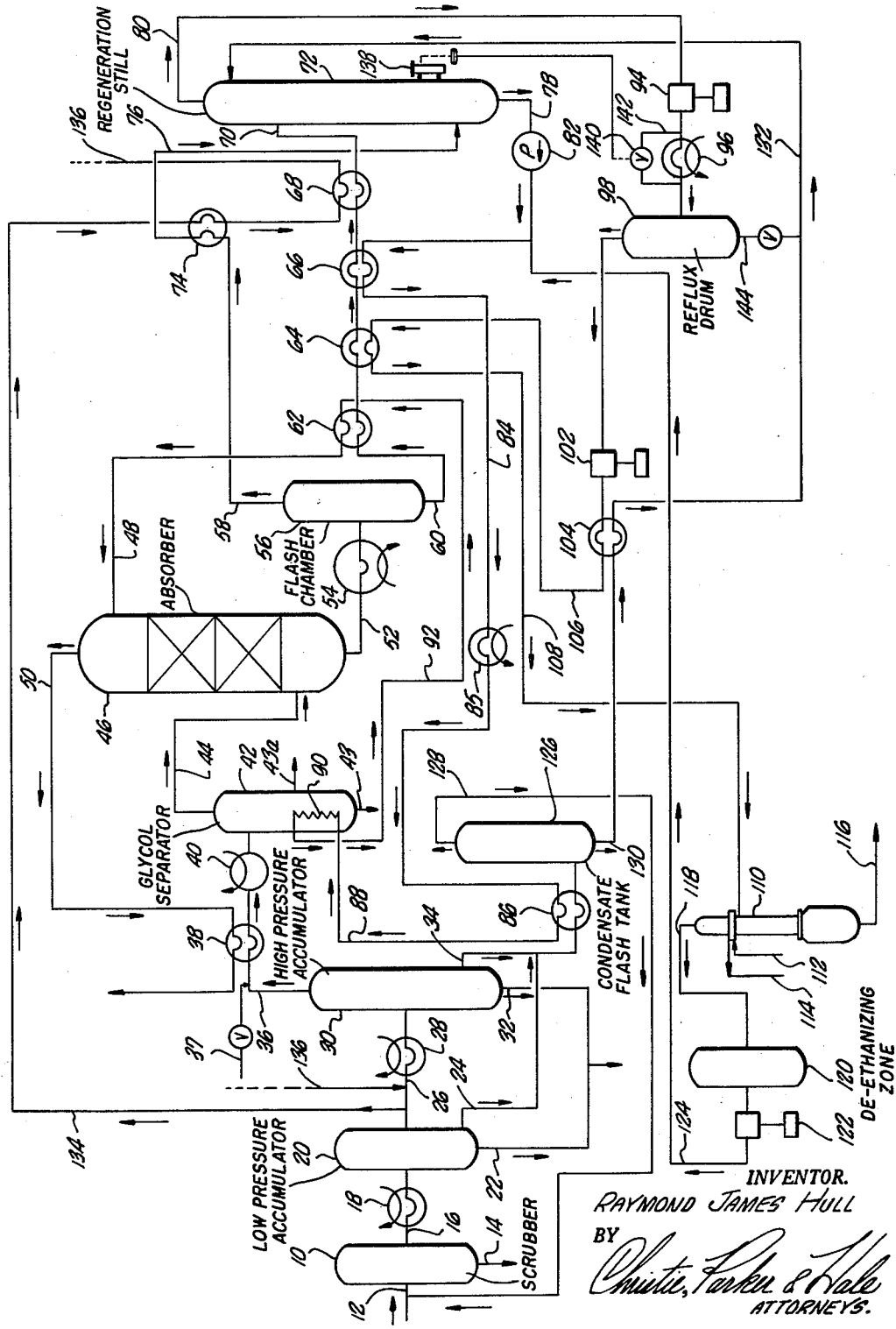

This invention relates to treatment of natural gas and particularly to such treatment by means of an improved oil absorption process for removing high molecular weight hydrocarbon constituents from natural gas streams.

The term "natural gas" refers to the gaseous mixture of hydrocarbon compounds produced from subterranean reservoirs. As produced, naural gas frequently contains relatively large amounts of hydrocarbon constituents that are higher in molecular weight than ethane. In this state it is called "wet natural gas." Not only is it necessary to remove high molecular weight hydrocarbon constituents from wet natural gas to meet specifications from transmission in pipelines, but such constituents are valuable by-products in themselves. The recovery of propane and butane from wet natural gas provides liquid petroleum gas products, and the recovery of pentane, hexane, and higher molecular weight hydrocarbon constituents provides a product commonly referred to as "natural gasoline." It is therefore the objective of processes for treating wet natural gas to effect a high yield of the liquid petroleum gas products and the natural gasoline constituents present in the gas and to provide thereby a dry pipeline natural gas consisting essentially of methane with some ethane.

The treatment of wet natural gas is commonly accomplished in an absorption oil process in which upflowing wet natural gas is contacted in an absorber or absorption column with a downflowing absorption oil having a high absorptive capacity for the higher molecular weight hydrocarbon constituents in the natural gas. Propane and higher molecular weight hydrocarbon constituents are removed from the natural gas by the absorption oil so that the natural gas leaving the absorber consists essentially of methane and ethane. The rich absorption oil is then passed to a still in which hydrocarbon constituents absorbed from the natural gas are stripped from the absorption oil by hot vapors. The lean absorption oil is recycled to the absorber to contact wet natural gas.

In the past, relatively low pressures, in the range from 30 lb./sq. in. to 150 lb./sq. in., were used in absorption oil processes, and no refrigeration was supplied to remove heat of absorption from the system. Furthermore, since the absorption oils used were high molecular weight oils, having a molecular weight of 200 and higher, stripping in the still required use of steam to supply hot vapors. Heating of the high molecular weight absorption oils to produce stripping vapors resulted in decomposition of the oil.

In the present day practice, the process pressures are relatively high, being in the range fom 400 lb./sq. in. to 1000 lb./sq. in., and externally-supplied refrigeration is utilized to remove heat of absorption. In addition, absorption oils having molecular weights less than 200 are used so that direct heating of the absorption oil to boil the oil and provide stripping vapors in the still without use of steam can be practiced.

The process of the present invention is an improvement in an oil absorption process, which improvement enables both miniaturization of equipment and utilization of standard components, and also simplifies the processing steps required in the practice of the process. In this way, an economical process for treatment of relatively small throughputs of wet natural gas is provided. The process of the present invention for the removal of $C_3$ and heavier hydrocarbon constituents from wet natural gas includes the step of contacting wet natural gas with an absorption oil at superatmospheric pressure to obtain a rich absorption oil stream and a natural gas stream substantially free of $C_3$ and heavier constituents. The pressure of the rich absorption oil stream is then reduced to separate as a gaseous stripping medium low molecular weight hydrocarbon constituents absorbed from the wet natural gas by the absorption oil. The absorption oil is then heated and contacted with the gaseous stripping medium. There is thereby provided a lean absorption oil stripped of the $C_3$ and heavier hydrocarbon constituents and utilizable for recycling to contact wet natural gas, and an overhead product of a gaseous mixture of low molecular weight hydrocarbon constituents and the $C_3$ and heavier constituents.

The low molecular weight hydrocarbon constituents separated from the rich absorption oil by the reduction in pressure are essentially methane and some ethane. Through the use of these constituents as a stripping medium, the heat requirements in the still are materially reduced and, as will hereinafter be described in greater detail, can be supplied by utilization of heat generated by standard equipment in the system, which heat would otherwise be wasted. In this manner, the over-all heat requirements for the system are markedly reduced.

To provide a high content of methane in the stripping medium removed from the rich absorption oil by reduction of pressure, it is generally preferred to use externally-supplied refrigeration to cool the rich absorption oil after it leaves the absorption column but before it is expanded to a lower pressure. The application of externally-supplied refrigeration at this point results in a stripping medium composed substantially of methane and some ethane and, at the same time, removes heat which must necessarily be removed at some point in the process to provide a reduced temperature in the absorption column.

As will be later described in greater detail, the arrangement of the preferred form of the process of the present invention achieves a heat exchange balance which minimizes the refrigeration requirements and the heating requirements for the over-all system. The net cooling required approaches the practical thermodynamic minimum of the heat of absorption of the desired hydrocarbon constituents. The net heating required in the stripping still approaches the heat of vaporization of these same constituents in the still. The process of the present invention may be varied to provide other significant advantages with respect to the utilization of heat in the system so as to control the over-all requirements for refrigeration and heating to within the thermodynamic limits described above.

The process of the present invention will be more clearly understood from the following description of a specific embodiment of the process taken in conjunction with the accompanying flow sheet. The process is described for treatment of a low-pressure gas, up to about 50 lb./sq. in. in pressure.

A wet natural gas containing methane, ethane, propane, and higher molecular weight hydrocarbon constituents enters a scrubber 10 by means of a line 12 for removal of any condensed water and/or condensed hydrocarbons present in the natural gas. Condensed water leaves the scrubber by a line 14 and passes to a water sump system (not shown). The natural gas leaves the scrubber by a line 16, is compressed (not shown), passes through an air-cooled heat exchanger 18, and enters a low-pressure accumulator 20. Additional condensed water separated from the natural gas within the low-pressure accumulator is passed to the water sump system by a line 22, and condensed hydrocarbons removed from the wet natural gas leave accumulator 20 by a line 24. The natural gas leaves the accumulator by a line 26, is again compressed (not shown), passes through an air-cooled heat exchanger 28, and enters a high-pressure accumulator 30. Condensed water and condensed hydrocarbons removed from the natural gas in the high-pressure accumulator leave the accumulator by lines 32, 34, respectively. It will be apparent that where the process is used for treatment of high-pressure gases, only the scrubber is required. The system described to this point is a conventional system for removal of condensed liquids from wet natural gas.

The wet natural gas, free of condensed liquids, leaves the top of accumulator 30 by a line 36. A suitable glycol, such as diethylene glycol, is added through a line 37 by injection into line 36, and the mixture is cooled by passage through a heat exchanger 38 in indirect heat transfer relationship with treated natural gas. The wet natural gas-glycol mixture is then passed successively through a water or refrigerant-cooled heat exchanger 40 and a glycol separator 42. In the glycol separator, water-containing glycol leaves the bottom of the separator by a line 43 and is purified in a glycol regeneration unit (not shown). Condensed hydrocarbons are removed through a line 43a and are added to the gaseous mixture in line 108 for de-ethanization as will later be described. The dehydrated natural gas leaves the top of the glycol separator by a line 44 and enters the bottom section of an absorption column or absorber 46.

Within absorber 46, the wet natural gas flows upwardly through a series of packing rings, baffles, or the like, as required to place it in direct intimate contact with a down-flowing low molecular weight absorption oil which enters the absorber near its top by a line 48. In general, the absorber is operated at a pressure in the range from 400 to 1000 lb./sq. in. and at a relatively low temperature. The intimate contact between the downwardly-flowing absorption oil and the upwardly-flowing wet natural gas, strips from the natural gas substantially all of the $C_3$ and heavier hydrocarbon constituents in the natural gas. In addition, some methane and ethane are absorbed by the absorption oil. A dehydrated dry natural gas leaves the top of the absorber by a line 50 and passes through heat exchanger 38 in indirect heat transfer relationship with the inlet wet natural gas as previously described. The treated gas leaving the absorber is at a temperature such that it can be effectively used to precool the inlet wet natural gas.

Rich absorption oil including methane and ethane as well as $C_3$ and heavier components absorbed from the natural gas and heated by their heat of absorption leaves the bottom of the absorber by a line 52 and passes through a heat exchanger 54. Within heat exchanger 54, the rich absorption oil is cooled by indirect heat transfer with a refrigerant supplied to the heat exchanger from an external refrigerating system (not shown). The cooled rich absorption oil is reduced in pressure by expanding it within a flash chamber 56. The reduction in pressure, particularly in view of the low temperature of the absorption oil, produces a gaseous stripping medium of low molecular weight hydrocarbon constituents consisting essentially of methane together with some ethane. The gaseous stripping medium leaves the top of the flash chamber by a line 58. Rich absorption oil containing $C_3$ and heavier hydrocarbon constituents but substantially free of methane and ethane, leaves the bottom of the flash chamber by a line 60 and successively passes through heat exchangers 62, 64, 66, and 68. As will be described in greater detail below, the passage of the rich absorption oil through heat exchangers 62, 64, 66, and 68 in indirect heat exchange relationship with fluid media to be described utilizes the available heat in the system to heat the absorption oil prior to its entry by a line 70 into the upper portion of a regeneration still 72. Therefore, the rich absorption oil within the still is at an elevated temperature suitable for removal of hydrocarbon constituents absorbed from the wet natural gas.

The gaseous stripping medium of methane and some ethane leaving the top of flash chamber 56 by line 58 optionally passes through a heat exchanger 74, and by a line 76 enters the lower portion of the regeneration still. In heat exchanger 74, the stripping medium can be heated by passing in indirect heat transfer relationship with a portion of the inlet wet natural gas, as will be later described.

Within the still, the stripping medium vapors rise countercurrently to, and in intimate contact with, the downflowing hot rich absorption oil. The combination of the stripping action of the methane and ethane and the elevated temperature of the rich absorption oil, strips from the absorption oil the absorbed $C_3$ and heavier hydrocarbon constituents to provide a lean absorption oil for recycling in the system. This is achieved without any fired equipment in association with the still, since the operating temperature within the still is between 100° and 200° F. The lean absorption oil leaves the bottom of the still by a line 78. The gaseous overhead still product consisting of methane and ethane together with $C_3$ and heavier hydrocarbon constituents stripped from the absorption oil, leaves the top of the still by a line 80.

To describe the flow of the lean absorption oil after it leaves the bottom of the still through line 78, the lean oil is pumped by an oil discharge pump 82 through heat exchanger 66 in indirect heat transfer relationship with the rich absorption oil. The lean oil is partially cooled within heat exchanger 66 and then, in the embodiment of the process shown in the flow sheet, successively passes by a line 84 through an air or water-cooled heat exchanger 85, a heat exchanger 86, a line 88, and a heat exchanger coil 90 within the bottom of glycol separator 42.

In heat exchanger 66, the hot lean absorption oil is passed in indirect heat transfer relationship with rich absorption oil, thereby achieving cooling of the lean oil with attendant heating of the rich oil prior to its entry into the still. In heat exchanger 86, the lean absorption oil is cooled by indirect heat transfer with hydrocarbon condensate from high-pressure accumulator 30. In heat exchanger coil 90, the lean absorption oil is still further cooled by indirect heat transfer with glycol and hydrocarbon within the glycol separator. The lean absorption oil leaves the heat exchanger coil of the glycol separator by a line 92 and passes through heat exchanger 62 in indirect heat transfer with cold rich absorption oil leaving flash chamber 56. The major cooling of the lean absorption oil stream prior to its entry into the absorber to contact wet natural gas occurs in the heat exchange within heat exchangers 62. Alternatively, the lean absorption oil may be passed directly from heat exchanger 66 to heat exchanger 62. Where this alternative is followed, the lean absorption oil leaving heat exchanger 66 is air-cooled in a heat exchanger (not shown) before entering heat exchanger 62. The practice of the process whereby the lean absorption oil also passes through heat exchanger 86 and/or heat exchanger coil 90, acts to minimize further the refrigeration required by cooling the lean absorption oil wherever feasible in the system. The cold lean absorption oil leaves heat exchanger 62 and enters absorber 46 by line 48 to contact wet natural gas in the manner previously described.

To described the flow of the gaseous mixture of methane and ethane, and $C_3$ and heavier hydrocarbon constituents, leaving the top of the still by line 80, this gaseous mixture is compressed in a first stage compressor 94 and the compressed mixture is partially cooled in an air-cooled heat exchanger 96. Condensed liquids in the cooled compressed mixture are removed from the gaseous mixture in drum 98. The gaseous mixture is then further compressed in compressor 102 and, optionally, may be partially cooled in a heat exchanger 104 by heat exchange with condensed hydrocarbon constituents from the inlet wet natural gas, as will be more fully described below. The compressed gaseous mixture, still at an elevated temperature, leaves heat exchanger 104 by a line 106 and is cooled by passage through heat exchanger 64 in indirect heat transfer relationship with the rich absorption oil.

The cooled compressed gaseous mixture leaves heat exchanger 64 by a line 108 and enters near the top of a refrigerating rectifier 110, which may be a column such as described in U.S. Patent No. 2,964,915. In rectifier 110, hydrocarbons heavier than ethane are condensed by indirect heat transfer with an externally-supplied refrigerant which enters the de-ethanizer through a line 112 and leaves by a line 114. The condensed hydrocarbons, consisting essentially of propane, butane, and natural gasoline components, leave the bottom of the rectifier by a line 116. While further treatment is not shown, it will be understood that the condensed liquid product from the bottom of the rectifier may be then treated as required to separate the liquid petroleum gas products from the gasoline components.

A gaseous product consisting substantially of methane and some ethane leaves the top of the rectifier by a line 118 and passes through a separator drum 120. Preferably, the methane-ethane product is then compressed in a compressor 122 and is passed through a line 124 into the discharge side of oil discharge pump 82. The lean absorption oil is thereby presaturated at the point in the system where the greatest benefit is derived. Dissolution of the methane-ethane mixture in the lean absorption oil heats the oil both by the heat of absorption and the sensible heat of the methane-ethane mixture gained as a result of its compression in compressor 122. The mass of the lean absorption oil is also increased. The presaturated lean absorption oil, heated as herein described, reduces the heat requirements in still 72 since it increases the temperature of the rich absorption oil in the heat transfer which occurs, as previously described, in heat exchanger 66. Furthermore, by reason of its presaturation, the heat of absorption in absorption column 46 is reduced so that the refrigerating requirements for the over-all system are reduced.

The removal of high molecular weight hydrocarbon constituents as liquid condensate in high-pressure accumulator 30 has been previously described. These condensates, consisting primarily of pentane, hexane, heptane, and heavier hydrocarbon constituents, leaving the accumulator by line 34, may be passed through exchanger 86 in indirect heat transfer relationship with lean absorption oil to cool it as previously described. The condensate then enters a condensate flash tank 126 in which any low molecular weight hydrocarbon constituents are separated as a gas from the higher molecular weight liquid components. The separated gaseous products leave the top of the condensate tank by a line 128 and are added to the wet nautral gas ahead of scrubber 10. Liquid condensate leaves the bottom of the flash tank by a line 130 and may be passed directly to liquid product storage or other treatment. Alternatively, as shown in the embodiment of the process in the flow sheet, it is passed through heat exchanger 104 in indirect heat transfer with the hot compressed gaseous mixture leaving compressor 102 and then by means of the line 132 enters the regeneration still at a point above the point of entry of the rich absorption oil into the still. In this manner, advantage is taken of the high stripping factor in the upper portion of the regeneration still to carry out the desired components as part of the gaseous overhead product.

The over-all operation of the system can be improved by provision for a liquid level control 138 to control the liquid level in still 72. The liquid level control maintains the liquid level in still 72 constant by adjusting the volume of gaseous mixture flowing through air-cooled heat exchanger 96, and thereby varying the amount of liquid hydrocarbons condensed in heat exchanger 96. Responsive to changes in liquid level in still 72, the liquid level control adjusts the position of a valve 140 in a by-pass line 142 around heat exchanger 96. For example, if the liquid level in still 72 drops, the flow through valve 140 is reduced by closing of the valve and more gaseous mixture flows through heat exchanger 96. As a result, the amount of condensed hydrocarbons separated in drum 98 is increased. With an increase in liquid level in still 72, the flow through valve 140 is increased so that less gaseous mixture passes through heat exchanger 96 and the amount of condensed hydrocarbons is decreased. The condensed hydrocarbons pass by a line 144 from the bottom of drum 98 into line 132. The amount of hydrocarbons condensed in heat exchanger 96 acts as reflux to maintain the absorption oil volume in the system constant. This in turn results in the maintenance in the system of an absorption oil of substantially constant molecular weight.

As a further alternative for utilizing the available heat in the inlet wet natural gas, which is at a relatively high temperature, a portion of the inlet gas leaving the low-pressure accumulator is by-passed through a line 134 to pass successively through heat exchangers 74 and 68. In heat exchanger 74, the wet inlet gas heats the gaseous stripping medium leaving flash tank 56 prior to passage of the stripping medium into the regeneration still. In heat exchanger 68, the wet inlet gas heats the rich absorption oil immediately prior to its passage into the regeneration still. The wet inlet gas is returned to the main gas stream after passage through heat exchanger 68 by means of a line 136.

It will be seen that the arrangement of heating and cooling provided in the oil absorption process of the present invention derives the maximum advantage of temperature differentials existing in the fluids of the process. For example, the rich absorption oil is cooled by an externally-supplied refrigerant immediately subsequent to its exit from the absorber and prior to reduction of pressure of the absorption oil. In this manner, cooling takes place at the maximum temperature of the absorption oil so that heat transfer efficiency is also at a maximum. Furthermore, cooling of the rich absorption oil at this point insures that a minimum amount of $C_3$ and heavier hydrocarbon constituents are flashed as part of the gaseous stripping medium when the rich absorption oil is passed into the flash chamber. Heat exchangers 62, 64, and 66 are arranged so that the heat of the system such as compressor heat, which would otherwise be wasted, is used to heat the rich absorption oil before its entry into the still for regeneration. The heat economy of the process of the present invention is demonstrated by the fact that the practice of the process results in fuel gas consumption which is about one-third of the fuel gas typically required to effect liquid component separation in other absorption oil processes.

The following data illustrate the heat exchange which occurs in the specific embodiment of the process shown in the accompanying flow sheet. Table I below shows the hydrocarbon constituents present in the wet natural gas and the percent of recovery of each of these constituents by the practice of the process. Table II below shows the entry temperatures and exit temperatures of the fluids in several of the units utilized in the process.

*Table I*

| Hydrocarbon Constituents of Inlet Wet Gas | Percent by Volume | Percent Recovered |
|---|---|---|
| Methane | 66.26 | |
| Ethane | 7.28 | |
| Propane | 15.22 | 91.4 |
| Iso-Butane | 1.96 | 99.1 |
| n-Butane | 5.80 | 99.5 |
| Iso-Pentane | 1.09 | |
| n-Pentane | 1.17 | 99.5 |
| Hexane | 0.80 | |
| Heptane and heavier | 0.42 | |

Table II

|  | Entry Temp., °F. | Exit Temp., °F. |
| --- | --- | --- |
| Absorber: |  |  |
| Natural Gas | 20 | 34 |
| Absorption Oil | 30 | 56 |
| Heat Exchanger 54: |  |  |
| Rich Absorption Oil | 56 | 20 |
| Heat Exchanger 62: |  |  |
| Rich Absorption Oil | 15 | 60 |
| Lean Absorption Oil | 78 | 30 |
| Heat Exchanger 64: |  |  |
| Rich Absorption Oil | 60 | 110 |
| Compressed Gas Mixture | 133 | 70 |
| Heat Exchanger 66: |  |  |
| Rich Absorption Oil | 110 | 154 |
| Lean Absorption Oil | 185 | 124 |
| Heat Exchanger 68: |  |  |
| Rich Absorption Oil | 154 | 190 |
| Inlet Wet Natural Gas | 260 | 194 |
| Regeneration Still: |  |  |
| Absorption Oil | 190 | 185 |
| Overhead Gas Product |  | 165 |
| Heat Exchanger 74: |  |  |
| Gaseous Stripping Medium | 20 | 270 |
| Inlet Wet Natural Gas | 280 | 260 |

Where conditions are such that high molecular weight hydrocarbon constituents are not condensed prior to passage of the wet natural gas into the absorber, a portion of the cold lean absorption oil stream (approximately 10%) may be by-passed prior to entry into the absorber and added, as at heat exchanger 49, to absorb the pentane and heavier components and prevent these high molecular weight hydrocarbon constituents from entering the absorber. This enriched absorption oil stream is heated separately from the rich absorption oil stream from absorber 46, and is fed to the regeneration still above the point of entry of the main stream but below the top reflux point. The high stripping efficiency attained at the top of the regeneration column allows recovery of the absorbed heavier hydrocarbon constituents as the overhead still product.

The process of the present invention has been described for the purpose of illustration of its operation with reference to the specific embodiment shown in the accompanying flow sheet. It will be understood that modifications in the specific arrangement shown may be made without departing from the scope of the invention as claimed.

For purposes of clarity, auxiliary equipment such as level control devices, pumps, and valves have not been included in the flow sheet. A description of the function of these and their location in the process, as required, is not necessary for an understanding of the invention, as such details will be apparent to those skilled in the art.

I claim:

1. A process for the removal of $C_3$ and heavier hydrocarbon constituents from a wet natural gas which process comprises the steps of contacting wet natural gas with an absorption oil at superatmospheric pressure to obtain a rich absorption oil stream and a natural gas stream substantially free of $C_3$ and heavier constituents, reducing the pressure of the rich absorption oil stream to separate as a gaseous stripping medium low molecular weight hydrocarbon constituents absorbed from the wet natural gas by the absorption oil, heating the absorption oil, contacting the heated absorption oil with the gaseous stripping medium to obtain a lean absorption oil and a gaseous mixture of low molecular weight hydrocarbon constituents and $C_3$ and heavier constituents removed from the absorption oil, compressing the gaseous mixture, passing the compressed gaseous mixture and the absorption oil in indirect heat transfer relationship to heat the oil before it is heated and contacted by the gaseous stripping medium; and to cool the compressed gaseous mixture to condense a substantial portion of the $C_3$ and heavier constituents, and passing the compressed gaseous mixture together with the condensed constituents to a de-ethanizer.

2. A process for the removal of $C_3$ and heavier hydrocarbon constituents from a wet natural gas which process comprises the steps of contacting wet natural gas with an absorption oil at superatmospheric pressure to obtain a rich absorption oil stream and a natural gas stream substantially free of $C_3$ and heavier constituents, cooling the rich absorption oil by externally-supplied refrigeration, reducing the pressure of the rich absorption oil stream to separate as a gaseous stripping medium low molecular weight hydrocarbon constituents absorbed from the wet natural gas by the absorption oil, heating the absorption oil, contacting the heated absorption oil with the gaseous stripping medium to obtain a lean absorption oil and a gaseous mixture of low molecular weight hydrocarbon constituents and $C_3$ and heavier constituents removed from the absorption oil, compressing the gaseous mixture, passing the compressed gaseous mixture and the absorption oil in indirect heat transfer relationship to heat the oil before it is heated and contacted by the gaseous stripping medium and to cool the compressed gaseous mixture to condense a substantial portion of the $C_3$ and heavier constituents, passing the compressed gaseous mixture together with the condensed constituents to a de-ethanizer, cooling the lean absorption oil by passing it in indirect heat transfer relationship with the rich absorption oil before the rich absorption oil is heated by the compressed gaseous mixture, and passing the cooled lean absorption oil in contact with wet natural gas.

3. A process for the removal of $C_3$ and heavier hydrocarbon constituents from a wet natural gas which process comprises the steps of contacting wet natural gas with an absorption oil at superatmospheric pressure to obtain a rich absorption oil stream and a natural gas stream substantially free of $C_3$ and heavier constituents, cooling the rich absorption oil by externally supplied refrigeration, reducing the pressure of the rich absorption oil stream to separate a gaseous stripping medium consisting substantially of methane and ethane absorbed from the wet natural gas by the absorption oil, heating the absorption oil, contacting the heated absorption oil with the gaseous stripping medium to obtain a lean absorption oil and a gaseous mixture of methane and ethane together with $C_3$ and heavier constituents removed from the absorption oil, compressing the gaseous mixture, passing the compressed gaseous mixture and the absorption oil in indirect heat transfer relationship to heat the oil before it is heated and contacted by the gaseous stripping medium and to cool the compressed gaseous mixture to condense a substantial portion of the $C_3$ and heavier constituents, passing the compressed gaseous mixture together with the condensed constituents to a de-ethanizer to separate the $C_3$ and heavier constituents of the gaseous mixture from the methane and ethane, first cooling the lean absorption oil by passing it in indirect heat transfer relationship with the rich absorption oil after the rich absorption oil is heated by the compressed gaseous mixture, further cooling the lean absorption oil by passing it in indirect heat transfer relationship with the rich absorption oil before the rich absorption oil is heated by the compressed gaseous mixture, and passing the cooled lean absorption oil in contact with wet natural gas.

4. A process for the removal of $C_3$ and heavier hydrocarbon constituents from a wet natural gas which process comprises the steps of contacting wet natural gas with an absorption oil at superatmospheric pressure to obtain a rich absorption oil stream and a natural gas stream substantially free of $C_3$ and heavier constituents, reducing the pressure of the rich absorption oil stream to separate as a gaseous stripping medium low molecular weight hydrocarbon constituents absorbed from the wet natural gas by the absorption oil, heating the absorption oil, contacting the heated absorption oil with the gaseous stripping medium to obtain a lean absorption oil and a gaseous mixture of low molecular weight hydrocarbon constituents and $C_3$ and heavier constituents removed from the absorption oil, separating the $C_3$ and heavier constituents of the gaseous mixture from the low molecular weight hydrocarbon constituents, adding the low molecular weight hydrocarbon constituents to enrich the lean absorption oil, passing the enriched lean absorption oil in indirect heat exchange relationship with the rich absorption oil from which the gaseous stripping medium has been separated, and cycling the enriched lean absorption oil mixture to contact wet natural gas.

5. A process for the removal of $C_3$ and heavier hydrocarbon constituents from a wet natural gas which process comprises the steps of contacting wet natural gas with an absorption oil at superatmospheric pressure to obtain a rich absorption oil stream and a natural gas stream substantially free of $C_3$ and heavier constituents, reducing the pressure of the rich absorption oil stream to separate as a gaseous stripping medium low molecular weight hydrocarbon constituents absorbed from the wet natural gas by the absorption oil, heating the absorption oil, contacting the heated absorption oil with the gaseous stripping medium to obtain a lean absorption oil and a gaseous mixture of low molecular weight hydrocarbon constituents and $C_3$ and heavier constituents removed from the absorption oil, compressing the gaseous mixture, passing the compressed gaseous mixture and the rich absorption oil in indirect heat transfer relationship to heat said oil before it is contacted by the gaseous stripping medium, separating the $C_3$ and heavier constituents of the gaseous mixture from the low molecular weight hydrocarbon constituents, adding the low molecular weight hydrocarbon constituents to the lean absorption oil, cooling the lean absorption oil by passing it in indirect heat transfer relationship with the rich absorption oil before the rich absorption oil is heated by the compressed gaseous mixture, and passing the cooled lean absorption oil in contact with wet natural gas.

6. A process for the removal of $C_3$ and heavier hydrocarbon constituents from a wet natural gas which process comprises the steps of contacting wet natural gas with an absorption oil at superatmospheric pressure to obtain a rich absorption oil stream and a natural gas stream substantially free of $C_3$ and heavier constituents, cooling the rich absorption oil by externally-supplied refrigeration, reducing the pressure of the rich absorption oil stream to separate a gaseous stripping medium consisting substantially of methane and ethane absorbed from the wet natural gas by the absorption oil, heating the absorption oil, contacting the heated absorption oil with the gaseous stripping medium to obtain a lean absorption oil and a gaseous mixture of methane and ethane together with $C_3$ and heavier constituents removed from the absorption oil, compressing the gaseous mixture, passing the compressed gaseous mixture and the absorption oil in indirect heat transfer relationship to heat said oil before it is contacted by the gaseous stripping medium, separating the $C_3$ and heavier constituents of the gaseous mixture from the methane and ethane, adding the separated methane and ethane mixture to the lean absorption oil, cooling the lean absorption oil by passing it in indirect heat transfer relationship with the rich absorption oil before the rich absorption oil is heated by the compressed gaseous mixture, and passing the cooled lean absorption oil in contact with wet natural gas.

7. A process for the removal of $C_3$ and heavier hydrocarbon constituents from a wet natural gas which process comprises the steps of contacting wet natural gas with an absorption oil at superatmospheric pressure to obtain a rich absorption oil stream and a natural gas stream substantially free of $C_3$ and heavier constituents, reducing the pressure of the rich absorption oil stream to separate a gaseous stripping medium consisting substantially of methane and ethane absorbed from the wet natural gas by the absorption oil, heating the absorption oil, contacting the heated absorption oil with the gaseous stripping medium to obtain a lean absorption oil and a gaseous mixture of methane and ethane together with $C_3$ and heavier constituents removed from the absorption oil, compressing the gaseous mixture, passing the compressed gaseous mixture and the absorption oil in indirect heat transfer relationship to heat the oil before it is contacted by the gaseous stripping medium, separating the $C_3$ and heavier constituents of the gaseous mixture from the methane and ethane, adding the separated methane and ethane to the lean absorption oil, first cooling the lean absorption oil by passing it in indirect heat transfer relationship with the rich absorption oil after the rich absorption oil is heated by the compressed gaseous mixture, further cooling the lean absorption oil by passing it in indirect heat transfer relationship with the rich absorption oil before the rich absorption oil is heated by the compressed gaseous mixture, and passing the cooled lean absorption oil in contact with wet natural gas.

8. A process for the removal of $C_3$ and heavier hydrocarbon constituents from a wet natural gas which process comprises the steps of contacting wet natural gas with an absorption oil at superatmospheric pressure to obtain a rich absorption oil stream and a natural gas stream substantially free of $C_3$ and heavier constituents, cooling the rich absorption oil by externally-supplied refrigeration, reducing the pressure of the rich absorption oil stream to separate a gaseous stripping medium consisting substantially of methane and ethane absorbed from the wet natural gas by the absorption oil, heating the rich absorption oil, contacting the heated absorption oil with the gaseous stripping medium to obtain a lean absorption oil and a gaseous mixture of methane and ethane together with $C_3$ and heavier constituents removed from the absorption oil, compressing the gaseous mixture, the rich absorption oil being heated before contacting the gaseous stripping medium by passing it successively in indirect heat transfer relationship with lean absorption oil for the second time, the gaseous compressed mixture, lean absorption oil for the first time, and a portion of the wet natural gas, the heat exchange between the rich absorption oil and the compressed gaseous mixture cooling the gaseous mixture to condense a substantial portion of the $C_3$ and heavier constituents, passing the lean absorption oil subsequent to its second heat exchange with the rich absorption oil to contact wet natural gas, and passing the compressed gaseous mixture together with the condensed constituents to a de-ethanizer.

9. A process for the removal of $C_3$ and heavier hydrocarbon constituents from a wet natural gas which process comprises the steps of precooling inlet wet natural gas to condense $C_6$ and heavier constituents, contacting the wet natural gas with an absorption oil at superatmospheric pressure to obtain a rich absorption oil stream and a natural gas stream substantially free of $C_3$ and heavier constituents, passing the natural gas stream in indirect heat transfer relationship with the inlet wet natural gas, cooling the rich absorption oil stream by externally-supplied refrigeration, reducing the pressure of the rich absorption oil stream to separate a gaseous stripping medium consisting substantially of methane and ethane absorbed from the wet natural gas by the absorption oil, heating the absorption oil, contacting the heated absorption oil with the gaseous stripping medium to obtain a lean absorption oil and a gaseous mixture of methane and ethane together with $C_3$ and heavier constituents removed from the absorption oil, compressing the gaseous mixture, passing the compressed gaseous mixture and the absorption oil in indirect heat transfer relationship to heat the oil before it is contacted by the gaseous stripping medium, separating the $C_3$ and heavier constituents of the gaseous mixture from the methane and ethane, adding the separated methane and ethane to the lean absorption oil, first cooling the lean absorption oil by passing it in indirect heat transfer relationship with the rich absorption oil after the rich absorption oil is heated by the compressed gaseous mixture, further cooling the lean absorption oil by passing it in indirect heat transfer relationship with the rich absorption oil before the rich absorption oil is heated by the compressed gaseous mixture, and passing the cooled lean absorption oil in contact with wet natural gas.

10. A process for the removal of $C_3$ and heavier hydrocarbon constituents from a wet natural gas which process comprises the steps of contacting wet natural gas with an absorption oil at superatmospheric pressure to obtain a rich absorption oil stream and a natural gas stream substantially free of $C_3$ and heavier constituents, reducing the pressure of the rich absorption oil stream to separate as a gaseous stripping medium low molecular weight hydrocarbon constituents absorbed from the wet natural gas by the absorption oil, heating the absorption oil, contacting the heated absorption oil in a still with the gaseous stripping medium to obtain a lean absorption oil and a gaseous mixture of low molecular weight hydrocarbon constituents and $C_3$ and heavier constituents removed from the absorption oil, compressing the gaseous mixture, cooling the compressed gaseous mixture to condense an amount of heavier constituents sufficient to maintain constant the liquid level of absorption oil in the still, separating the $C_3$ and remaining heavier constituents of the gaseous mixture from the low molecular weight hydrocarbon constituents, adding the low molecular weight hydrocarbon constituents to enrich the lean absorption oil, passing the enriched lean absorption oil in indirect heat exchange relationship with the rich absorption oil from which the gaseous stripping medium has been separated, and cycling the enriched lean absorption oil mixture to contact wet natural gas.

References Cited by the Examiner
UNITED STATES PATENTS

| | | | |
|---|---|---|---|
| 1,510,434 | 9/24 | Hosmer | 208—341 |
| 2,250,716 | 7/41 | Legatski | 208—341 |
| 2,352,295 | 6/44 | Swerdloff | 208—346 |
| 2,388,048 | 10/45 | Garrison et al. | 208—346 |
| 2,409,691 | 10/46 | Noble | 208—341 |
| 2,413,503 | 12/46 | Katz | 208—341 |
| 2,630,402 | 3/53 | Miller et al. | 208—346 |
| 2,685,941 | 8/54 | Kassel | 55—44 |
| 2,757,754 | 8/56 | Natta I | 55—44 |
| 2,791,290 | 5/57 | Natta II | 55—44 |

OTHER REFERENCES

Petroleum Refiner, vol. 28, No. 9, September 1949, pp. 213, 216, 217, 218 and 220.

ALPHONSO D. SULLIVAN, *Primary Examiner.*

UNITED STATES PATENT OFFICE
CERTIFICATE OF CORRECTION

Patent No. 3,188,287                                      June 8, 1965

Raymond James Hull

It is hereby certified that error appears in the above numbered patent requiring correction and that the said Letters Patent should read as corrected below.

Column 10, line 48, for "$C_6$" read -- $C_3$ --.

Signed and sealed this 16th day of November 1965.

(SEAL)
Attest:

ERNEST W. SWIDER                                      EDWARD J. BRENNER
Attesting Officer                                             Commissioner of Patents